UNITED STATES PATENT OFFICE.

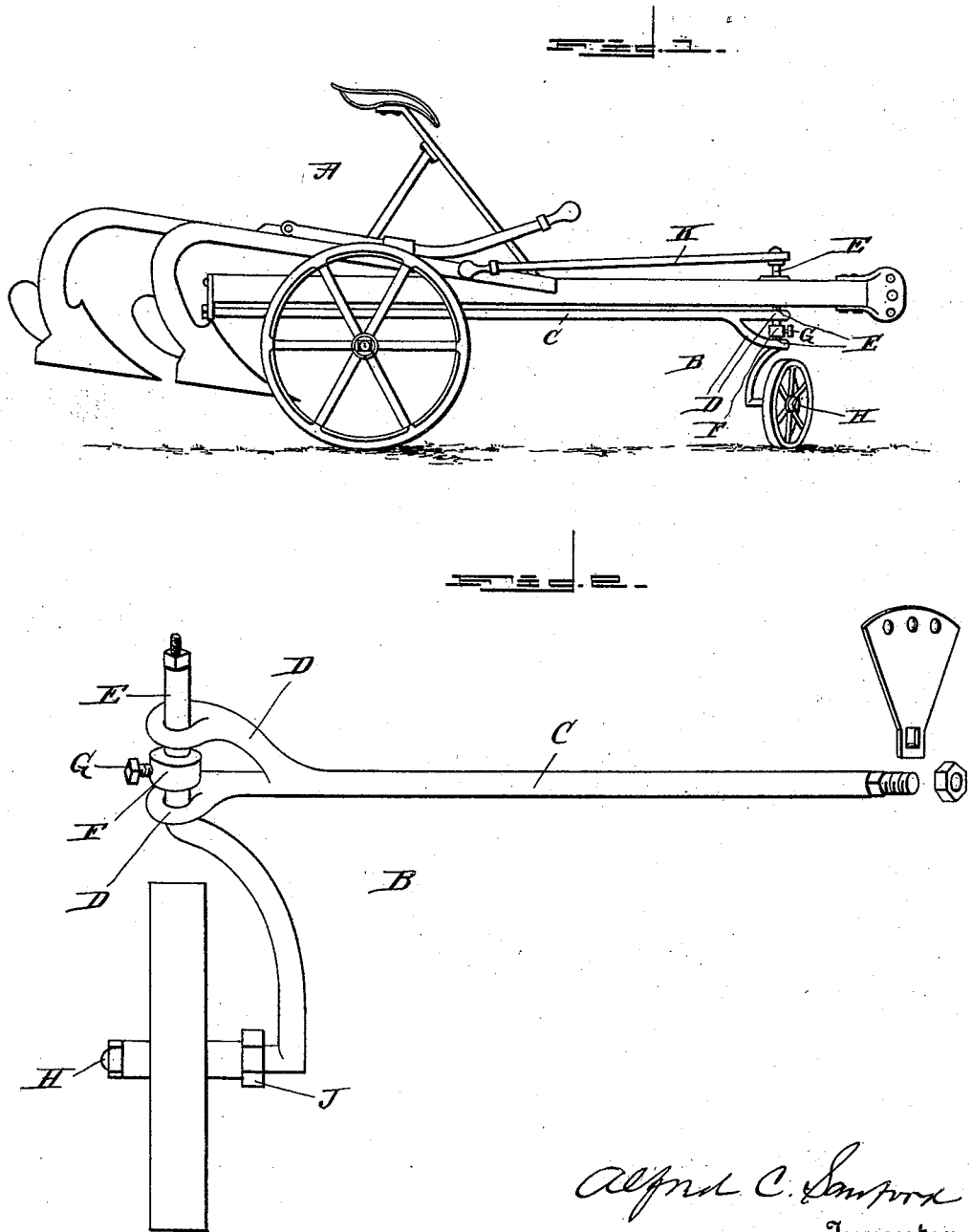

ALFRED C. SANFORD, OF THE DALLES, OREGON.

CASTER AXLE AND WHEEL.

SPECIFICATION forming part of Letters Patent No. 496,620, dated May 2, 1893.

Application filed July 23, 1892. Serial No. 441,000. (No model.)

*To all whom it may concern:*

Be it known that I, ALFRED C. SANFORD, a citizen of the United States, residing at The Dalles, in the county of Wasco and State of Oregon, have invented a certain new and useful Improvement in Caster Axles and Wheels; and I do hereby declare the following to be a full, clear, and exact description of the invention, such as will enable others skilled in the art to which it appertains to make and use the same.

This invention relates to an improvement in caster axles and wheels, such as are employed upon gang plows.

The object of the invention is to produce a caster axle and wheel which will permit the plow to make a square turn in either direction, while the plow is in the ground any depth, without working the levers or skipping unplowed land.

The further object is to produce a caster wheel which may be readily attached to any ordinary form of gang plow, and which shall be simple in construction, and efficient and durable in use.

The invention consists in the novel construction and combination of parts of a caster wheel and axle, as will be hereinafter fully described and claimed.

In the accompanying drawings forming a part of this specification, and in which like letters of reference indicate corresponding parts, Figure 1, is a side elevation of a gang plow with the caster wheel attached thereto, and Fig. 2, is a perspective view of the caster wheel and axle removed from the plow.

Referring to the drawings: A, designates a gang plow which may be of any approved construction, and provided with any desired number of shovels or points.

B, designates the improved caster wheel and axle comprising a beam C, the rear end of which is suitably secured to the plow beam, or any other desired point on the plow, and the front end is bifurcated, to form two arms D, the free ends of which are perforated to form bearings for the standard E of the caster axle. Upon the standard E, is placed a collar F, which is designed to work between the arms D, to retain the caster wheel in its proper position. A bolt G, passes through the collar and engages the standard E, serving to permit of vertical adjustment of the caster wheel and axle. The lower portion of the standard E, is bent at right angles to the vertical portion, and is also curved sufficiently to prevent the caster wheel from contacting with it, and its outer end is bent at an angle to the curved portion to form the axle proper H, on which the caster wheel is mounted, a collar J, serving to keep the wheel in its proper position with relation to the axle, a like collar J, serving to prevent the beam C, from riding down upon the said curved portion.

To the upper end of the standard E, is secured a lever K, by means of which the said axle may be turned so as to bring the wheel to any desired adjustment, and permit the plow to make either a short or a long turn as may be desired.

From the foregoing description it will readily be seen that my improved caster wheel and axle is exceedingly simple of construction, and may be readily applied to any ordinary gang plow without necessitating any change in the construction of the latter. Moreover, by reason of the collar F, and bolt G, the caster wheel and axle may readily be removed when it is desired.

Having thus fully described my invention, what I claim as new, and desire to secure by Letters Patent, is—

1. The combination with a gang plow of a beam, one end of which is rigidly secured to the plow, and the opposite end bifurcated to form arms provided with bearings, a standard working in the said bearings, an adjustable collar mounted on the standard between the arms, a caster wheel carried by the lower portion of the standard and a lever carried by the upper portion.

2. The combination with a gang plow of a beam rigidly secured thereto at one end, and having its free end bifurcated to form two arms each having a bearing, a standard having its upper end journaled in the bearings, and its lower end bent at right angles thereto and curved, an axle formed at the outer end of the curved portion, a collar on the axle, a caster wheel mounted on the axle, and designed to bear against the collar, an adjustable collar mounted on the standard between the arms, and a lever carried by the upper end of the standard.

In testimony whereof I affix my signature in presence of two witnesses.

ALFRED C. SANFORD.

Witnesses:
 E. B. DUFUR,
 M. H. ALLEN.